Aug. 4, 1931.                A. A. THOMAS                1,816,941
                             CHAIN FASTENER
                           Filed June 11, 1930

INVENTOR
Albin A. Thomas
By Archworth Martin,
Attorney.

Patented Aug. 4, 1931

1,816,941

UNITED STATES PATENT OFFICE

ALBIN A. THOMAS, OF YORK, PENNSYLVANIA, ASSIGNOR TO UNITED STATES CHAIN & FORGING COMPANY, OF PITTSBURGH, PENNSYLVANIA, A CORPORATION OF DELAWARE

CHAIN FASTENER

Application filed June 11, 1930. Serial No. 460,389.

My invention relates to chain fasteners, and more particularly to tightening and connecting devices such as are employed in fastening the side chains of anti-skid chain structures that are employed on automobile wheels, but it is capable of use in various other relations.

One object of my invention is to provide a fastening device of the type referred to that is more freely operable than various types which have heretofore been employed and which nevertheless securely retains the connected links against accidental displacement.

Another objects of my invention is to provide a fastening device wherein the necessity for snug-fitting movable parts which are difficult of operation through the presence of grit, rust, etc., is avoided.

Figure 1:
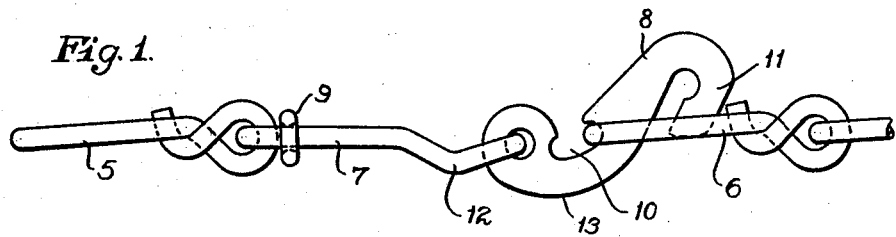
Figure 2:
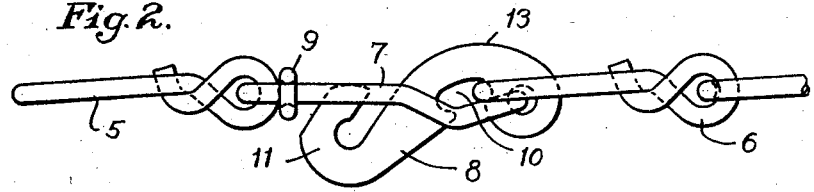
Figure 3:
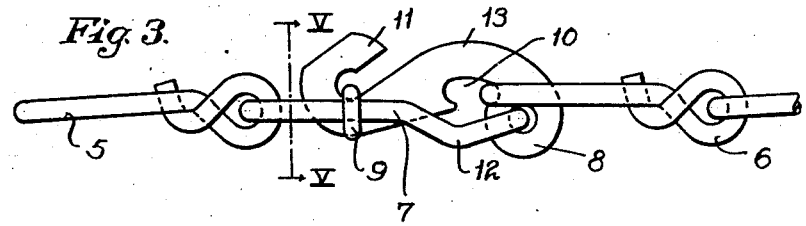
Figure 4:
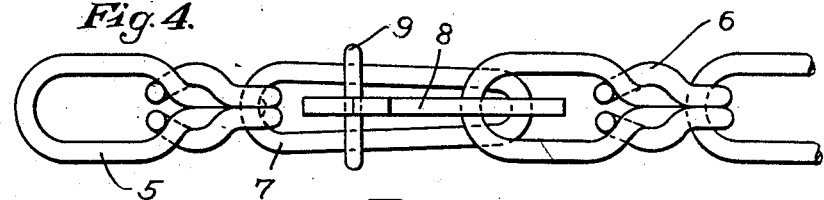
Figure 5:
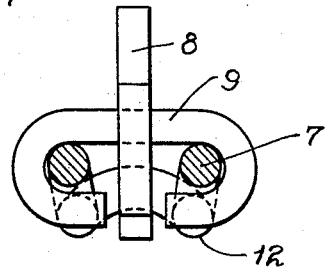

One form which my invention may take is shown in the accompanying drawings, wherein Figure 1 is a side elevational view of the device showing the fastener in partially open position; Fig. 2 shows the latching lever is closed position, but with the keeper in released position; Fig. 3 shows the device in completely locked position; Fig. 4 is a plan view of the structure of Fig. 3, and Fig. 5 is a view taken on the line V—V of Fig. 3, but on an enlarged scale.

The fastener is shown as employed for connecting end links 5 and 6 of a side chain or the like, and comprises a connecter link 7, a latching lever 8, and a keeper 9.

The lever 8 is provided with a recess 10 whose end walls are undercut to provide seats for the link 6 when the lever is in its open position, as shown in Fig. 1, and when the lever is closed, as shown in Fig. 3.

In effecting connection between the links 5 and 6, the free end of the lever 8 is pushed through the link 6 to the position shown in Fig. 1, and is then swung to the left until its hook portion 11 extends below the plane of the connecting link 7, as shown in Fig. 2, whereupon the keeper 9 is shifted from the position shown in Figs. 1 and 2, to the position shown in Fig. 3. The lever 8 may then be permitted to swing slightly in a clockwise direction under the tension of the chain links 5 and 6.

The keeper is not likely to become accidentally disengaged from the hook 11 through slackening of the chain links, since if the connecting link 7 is in a horizontal position when such slackness occurs, the keeper 9 obviously will remain in the position shown in Fig. 3, while if the right hand end of the link 7 is elevated at a time when slackness occurs, the lower portion of the keeper will slide into the hook 11 and thus be held against movement to the position shown in Fig. 1. On the other hand, if the left hand end of the link 7 is in elevated position when the chain is slack, the keeper 9 will slide toward the right hand end of the link and lie against the body portion of the lever 8, so that when a pull is again exerted on the hook, the keeper will be forced into the locking position shown in Fig. 3.

The ends of the keeper 9 are of such distance apart that they will permit the hook portion 11 of the lever 8 to pass between them as shown in Fig. 5, and thus allow the upper straight portion of the keeper to be moved from the position shown in Fig. 2, to that shown in Fig. 3.

The connecting link 7 is offset somewhat at the points 12 to more conveniently permit movement of the hook lever 8 to the position shown in Fig. 2, and without making the recess 10 of excessive depth, since sufficient clearance must be provided for the end of the link 6 between the bottom wall of the recess 10 and the upper side of the link to permit the lever 8 to be moved to the position shown in Fig. 2.

In opening the link, it is necessary only that the thumb be pressed against the upper or outer side of the hook portion 11, or the outer side of the bend or hump 13 in order to depress the lever 8 to the position shown in Fig. 2, and thus permit the keeper 9 to be slid to released position because of the space between the ends of the keeper as shown in Fig. 5, and need not be moved to a point completely below the lower-most plane of the keeper.

In order to prevent accidental disconnection of the link 6 from the lever 8, the hook portion 11 of the lever is made of sufficient size that it will, when moved to the position shown in Fig. 1, abut against the adjacent end of the link 6 and be thereby prevented from swinging to still further open position, while the undercut wall of the recess 10 will prevent the link 6 from being pulled out of the recess. In order to disconnect the lever 8 from the link 6, the lever must be moved into a position substantially at right angles to the link 6 to permit the link to be shifted longitudinally of itself to clear it of the recess 10.

The hook 11, when the lever 8 is in fully open position, as shown in Fig. 1, extends into the chain link 6 and serves as a stop against which the adjacent end of the link may abut, thus preventing such shifting of the link 6 to the left relative to the lever as will cause it to be disengaged from its seat within the recess 10.

I claim as my invention:

1. A fastener for chain links comprising a link of elongated loop form having a depression formed therein in a direction offset from the plane thereof, a latch lever pivotally connected at one of its ends to one end of said link and having its free end of backwardly-turned hook form and movable between the sides of said link, the lever being provided with a link-receiving recess which lies opposite to the said depression when the lever is in closed position, and a keeper slidably mounted on said link and movable into position above the said hook when the lever is in closed position.

2. A fastener for chain links comprising a link of elongated loop form having a depression formed therein in a direction offset from the plane thereof, a latch lever pivotally connected at one of its ends to one end of said link and having its free end of backwardly-turned hook form and movable between the sides of said link, the lever being provided with a link-receiving recess which lies opposite to the said depression when the lever is in closed position, and means having engagement with the said link and the hook for releasably retaining the hook in closed position.

In testimony whereof I, the said ALBIN A. THOMAS, have hereunto set my hand.

ALBIN A. THOMAS.